United States Patent [19]

Wood

[11] Patent Number: 4,928,116
[45] Date of Patent: May 22, 1990

[54] INK JET PRINTER HAVING IMPROVED PRINT HEAD HEATER CONSTRUCTION

[75] Inventor: Wendell L. Wood, Dayton, Ohio
[73] Assignee: Eastman Kodak Company, Rochester, N.Y.
[21] Appl. No.: 264,739
[22] Filed: Oct. 31, 1988
[51] Int. Cl.$^5$ ............................................. G01D 15/18
[52] U.S. Cl. ..................................................... 346/75
[58] Field of Search .............. 346/75, 142 R; 219/544

[56] References Cited

U.S. PATENT DOCUMENTS 4,357,526 11/1982 Yamamoto et al. ................. 219/544
4,560,991 12/1985 Schutrum .............................. 346/75
4,719,472 1/1988 Arakawa .......................... 346/140 R Primary Examiner—Bruce A. Reynolds
Assistant Examiner—Gerald E. Preston
Attorney, Agent, or Firm—John D. Husser

[57] ABSTRACT

A charge plate construction for a continuous ink jet print head includes a plurality of charge electrodes and a resistive heater element configured in a serpentine path around the charge electrodes. The electrodes and heater element can be electroplated portions embedded in a dielectric matrix. The heater element can also include a deflection electrode portion formed along its path downstream of the charge electrodes.

7 Claims, 6 Drawing Sheets

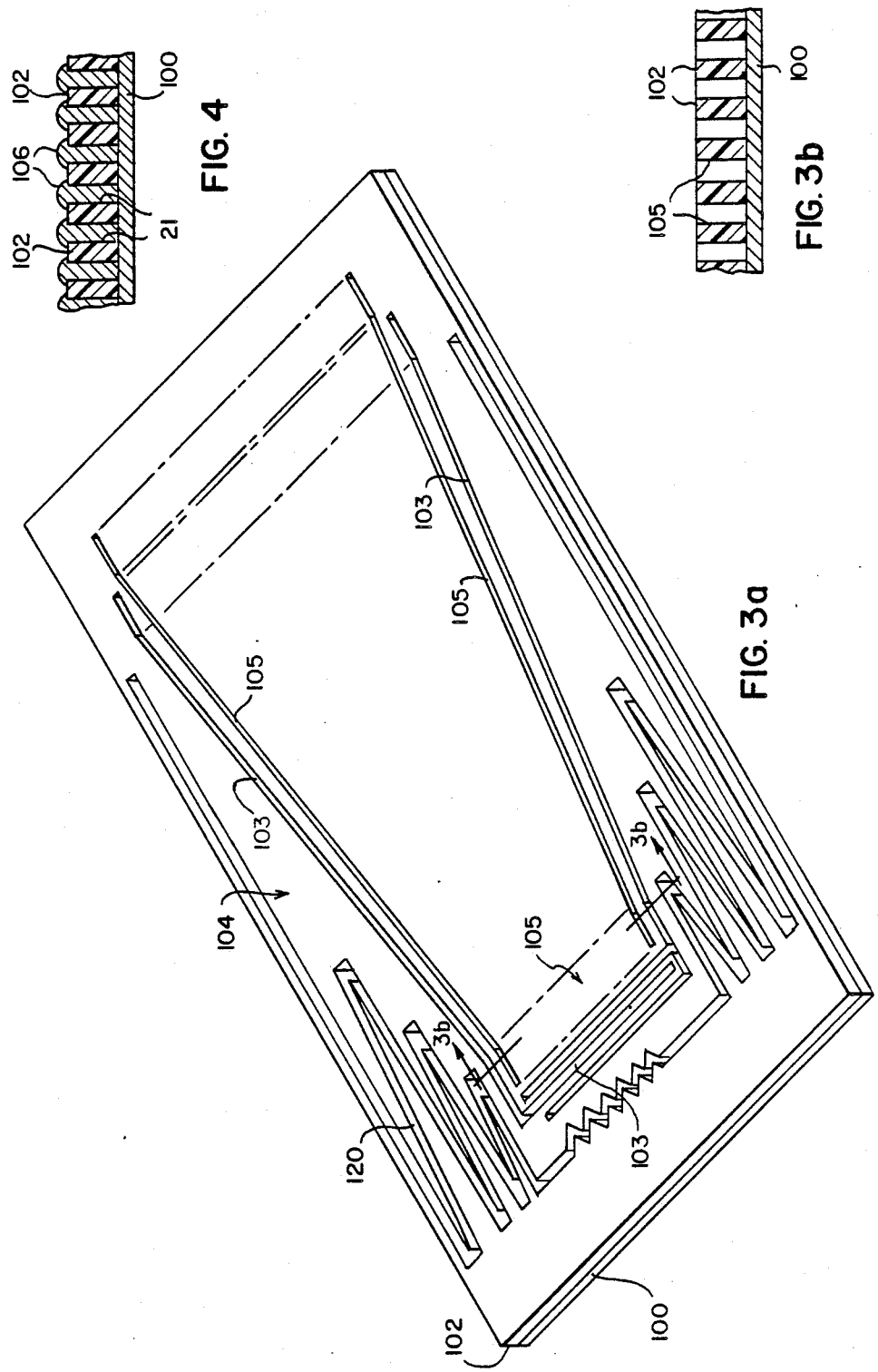

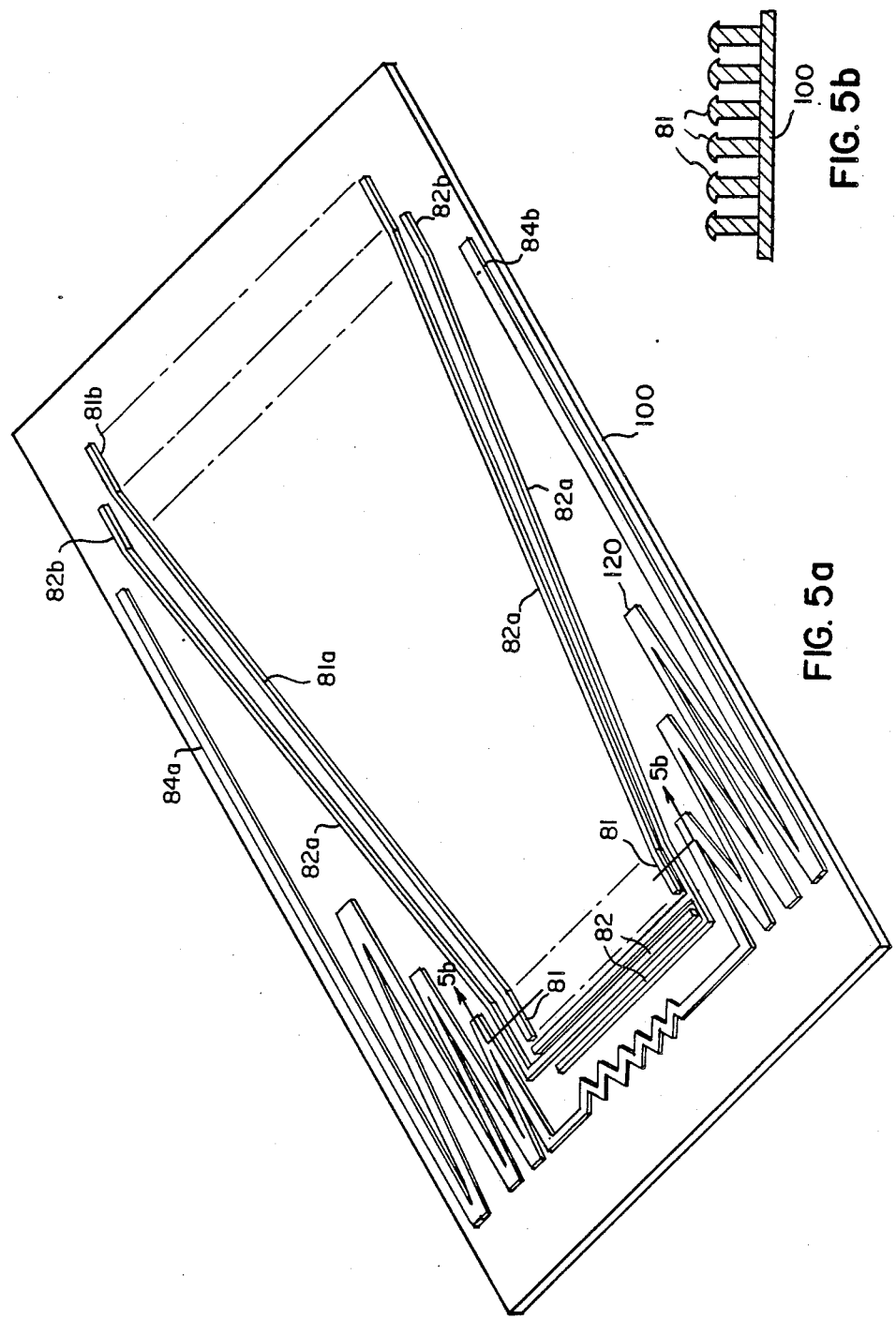

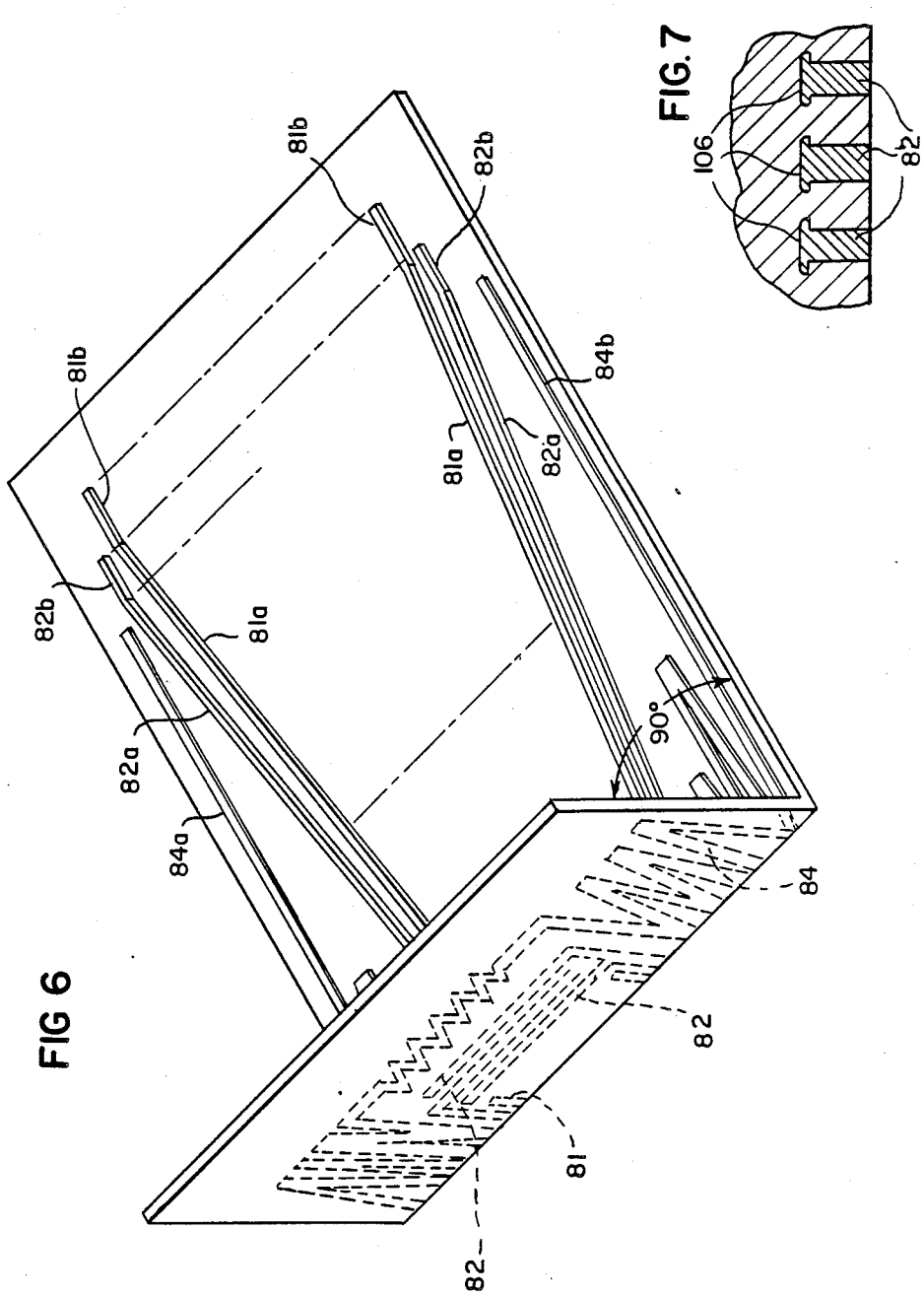

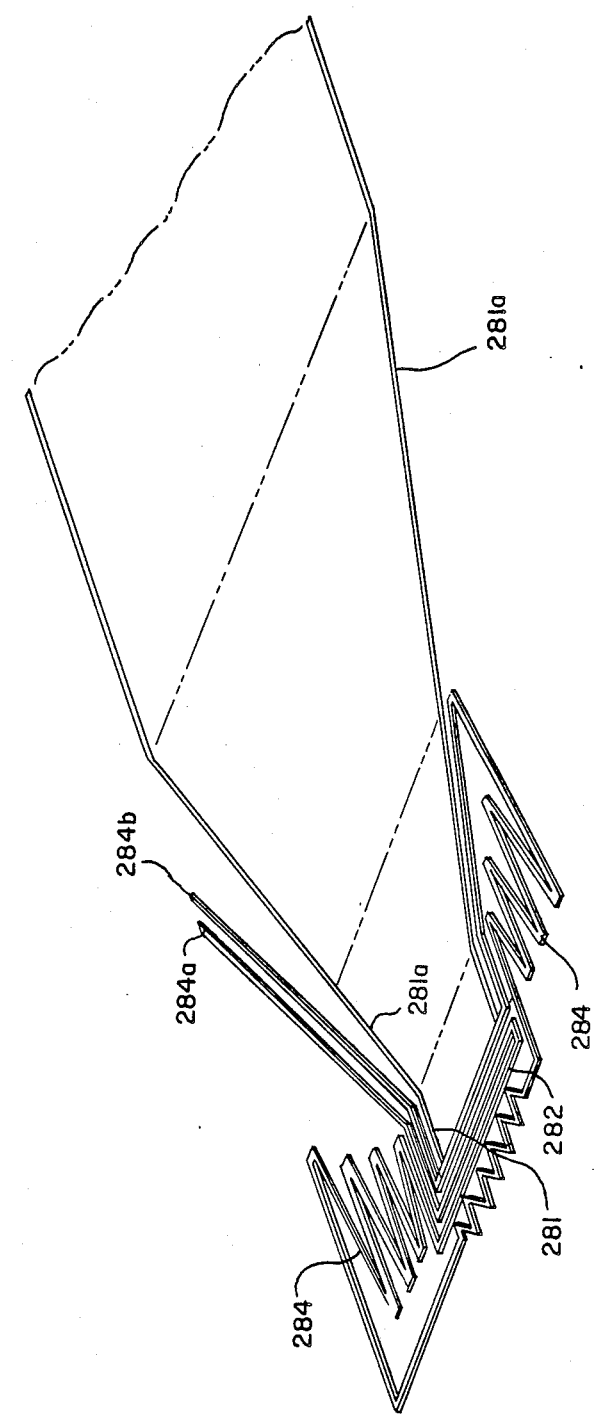

INK JET PRINTER HAVING IMPROVED PRINT HEAD HEATER CONSTRUCTION

FIELD OF INVENTION

The present invention relates to ink jet printers of the continuous type and more specifically to constructions of the print heads for such printers wherein drop charging electrodes and resistive heating elements are embedded in an integral dielectric matrix.

BACKGROUND OF INVENTION

In continuous ink jet printers an upper print head assembly receives ink under pressure and discharges it to form droplet streams directed generally toward a print zone. In "binary" printers of this type, there usually is provided an array of orifices which produce a plurality of ink streams that are simulated (e.g. by predeterminedly vibrating the orifice plate) to cause the streams to break up into uniformly sized and spaced droplets.

The breakup of each ink stream occurs adjacent a lower print head assembly charge plate, which comprises a plurality of separate charge electrodes, one for each ink drop stream. Charge is provided to drops according to information signals that control periodic voltage energizations of the charge electrodes. Charged drops are usually deflected to a lower print head catcher assembly, e.g. by a deflection electrode field intermediate the charge electrodes and catcher.

In order to assure accurate drop charging, it is important that the charge electrodes be clean and dry. Accumulation of ink or moisture on the charge plate can cause electrical shorting between adjacent electrodes and otherwise impair proper drop charging. Various techniques have been utilized to avoid liquid accumulations on the charge plate surfaces, including special start-up and shutdown procedures designed to control ink flows to not contact those surfaces.

Commonly assigned U.S. Pat. Nos. 4,591,870 and 4,622,562 describe approaches for cleaning the critical charge plate surfaces and assuring that ink and other moisture does not condense on them during printing operations. More particularly, the '870 patent describes a print head start-up routine wherein cycles of ink washing, air skiving and condensate washing are effected to periodically clean critical surfaces on the lower print head assemblies. The teachings in both patents point out that when ink droplets are formed rapidly and in large numbers proximate the lower print head surfaces, ink solvent from the ink streams, or moisture from entrained air, can condense on the charge plate surfaces and cause shorting. To remove such condensate and avoid further condensation, the '562 patent provides a resistance heater component that is adhered, by heat conductive adhesive, in a cavity that is machined into a top, interior portion of the catcher body. The catcher is formed of heat conductive material, e.g. stainless steel or filled plastic. After assembling the heater in the catcher, a molded charge plate assembly is mounted on the top of the catcher body in a heat transfer relation with the resistive heater such that the critical surfaces of the charge plate can be heated. While the construction of the '562 lower print head assembly functions well, it is not simple to fabricate. The heater element must be encapsulated, mounted into the catcher and connected to a heater power source. This involves procurement and handling of a number of discrete parts and their time consuming assembly.

SUMMARY OF INVENTION

One important purpose of the present invention is to provide a lower print head construction which achieves the functional advantages of the '562 approach (i.e. heating the near-environment to obviate condensation problems), while simplifying the print head construction (e.g. as to number of separate parts and assembly effort involved).

In one aspect the present invention constitutes an improved lower print head construction for continuous ink jet printing apparatus of the kind having means for directing a plurality of ink streams through a drop charge region toward a print zone. This construction can comprise charge electrodes located adjacent the drop charge region, with lead portions for discretely conducting information voltages to respective charge electrodes; resistive heating elements closely spaced to the charge electrodes and electrode leads with connections for applying a heating voltage to the heater elements; and (c) dielectric means for integrally embedding the charging electrodes and heating elements in such closely spaced relation.

In another aspect the present invention constitutes a method of fabricating such an improved charge plate assembly that includes the steps of: (a) forming on a substrate a photoresist pattern comprising outline boundaries of: (i) a plurality of charge electrodes with respective lead connector portions and (ii) a resistive heater element closely spaced to the charge electrodes and their lead connector portions; (b) electroplating within the boundaries to form discrete conductive elements within the outline boundaries; (c) bending the substrate to dispose the charge electrodes and portions of the heater elements at approximately 90° to the lead connector portions; (d) removing the photoresist; (e) embedding the exposed portions of the charge electrodes, resistive elements and lead connector portions in a dielectric matrix; and (f) removing the substrate to expose face surfaces of the charge electrodes, resistive elements and lead connector portions.

BRIEF DESCRIPTION OF THE DRAWINGS

The subsequent description of preferred embodiments refers to the accompanying drawings wherein:

FIG. 1-B is an enlarged cross-sectional view of a portion of FIG. 1-A;

FIG. 2-B is an enlarged cross-sectional perspective of a portion of the FIG. 2-A unit;

FIGS. 3-A and 3-B are perspective and cross section views illustrating one stage of fabrication of a charge plate and heater unit in accord with the present invention;

FIG. 4 is a cross section view illustrating a subsequent stage of fabrication of such unit;

FIGS. 5-A and 5-B are perspective and cross section views illustrating a further subsequent stage of the fabrication of such unit;

FIGS. 6 and 7 are perspective and cross section views illustrating yet further subsequent stages of the fabrication of such unit; and FIG. 8 is a perspective view showing an alternative deflection delectrode and heater configuration in accord with the present invention.

DETAILED DESCRIPTION OF PREFERRED EMBODIMENTS

Figure 1A:
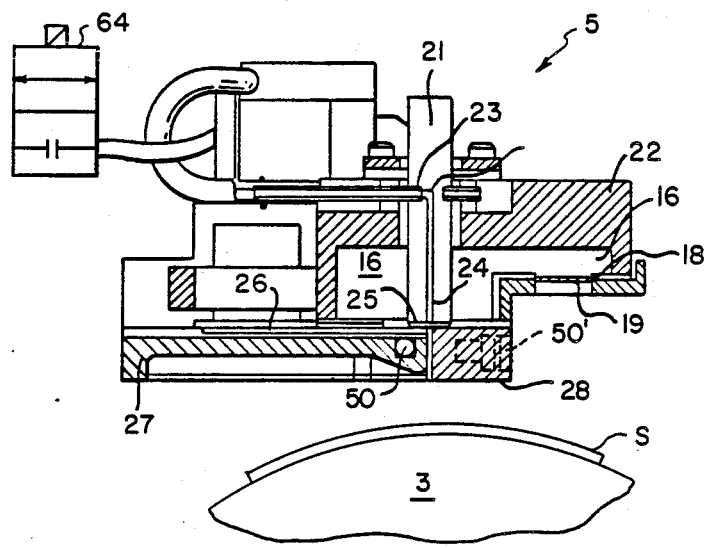
FIG. 1-A is a cross-sectional view showing the print head of one prior art ink jet printer in which the present invention can be used.
Figure 1B:
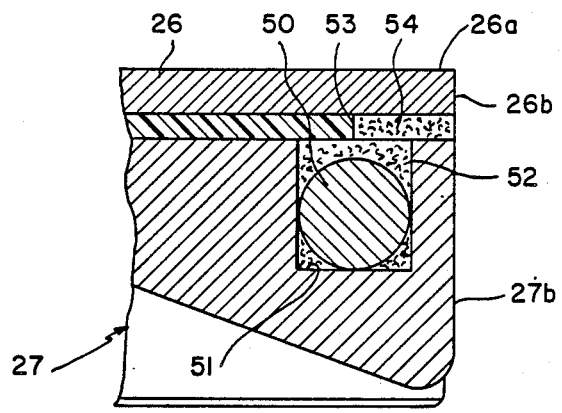

Referring to FIG. 1-A, a prior art print head assembly 5 on which the present invention improves, can be seen in more detail. The assembly 5 includes an upper print head portion including a print head body 21 mounted on housing 22 and having an inlet 23 for receiving ink. The body 21 has a passage leading to a print head cavity 24 and an outlet 29 (not shown) leading from the cavity 24 to an ink circulation system of apparatus 1. The upper print head portion also includes an orifice plate 25 and suitable transducer means (not shown) for imparting mechanical vibration to the body 21. Such transducer can take various forms known in the art for producing periodic perturbations of the ink filament(s) issuing from the orifice plate 25 to assure breakup of the ink filaments into streams of uniformly spaced ink droplets.

The lower portion of print head assembly 5 includes a charge plate 26 constructed to impart desired charge upon ink droplets at the point of filament breakup and a drop catcher configuration 27 that is constructed and located to catch non-printing droplets (in this arrangement charged droplets). Exemplary catcher configurations are described in U.S. Pat. Nos. 3,813,675; 4,035,811 and 4,268,836; however other constructions are useful. The lower print head assembly shown in FIG. 1-A includes a predeterminedly configured and located wall member 28 which provides protection and air control functions for the printer apparatus. The ink supply and circulation system of the FIG. 1-A apparatus includes various ink conduits (i.e. lines) which form an ink recirculation path to line 73 and from outlet valve 64.

Referring to FIG. 1-B, as well as FIG. 1-A, the prior art construction for preventing the accumulation of undesired liquid on operative surfaces of the lower print head is shown in more detail. Specifically, a resistance heater 50 is provided within the interior of catcher 27 at a location where its thermal energy can be readily conducted to raise the temperature of: (1) portions of the catcher surface 27b that are adjacent the droplet stream passing from orifice 25 to print substrate S and (2) the exposed surfaces 26a and 26b of charge plate 26. It can be seen that heater element is affixed in a cavity 51 by means of a thermally conductive adhesive 52. The main body of the catcher is preferably formed of stainless steel or filled plastic; however, other material having a good thermal conductivity can be used.

In the prior art embodiment shown in FIG. 1-B a spacer element 53, e.g. plastic shim material, is provided in an interior region between the charge plate and catcher and a plastic potting material, e.g. and epoxy resin, 54 couples the top of the catcher with charge plate 26. Thus, both surface 26a (which bears electrode leads) and surface 26b (which bears the drop charging electrodes) are heatable by heater 50 to a selected temperature above ambient.

Figure 2B:
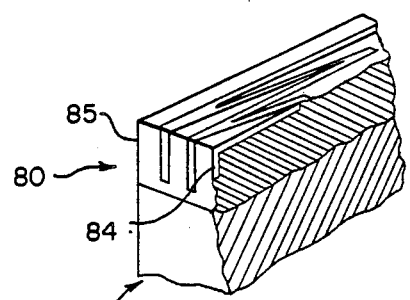
FIGS. 2-A is a front perspective view of one embodiment of charge plate and heater unit in accord with the present invention.
Figure 2A:
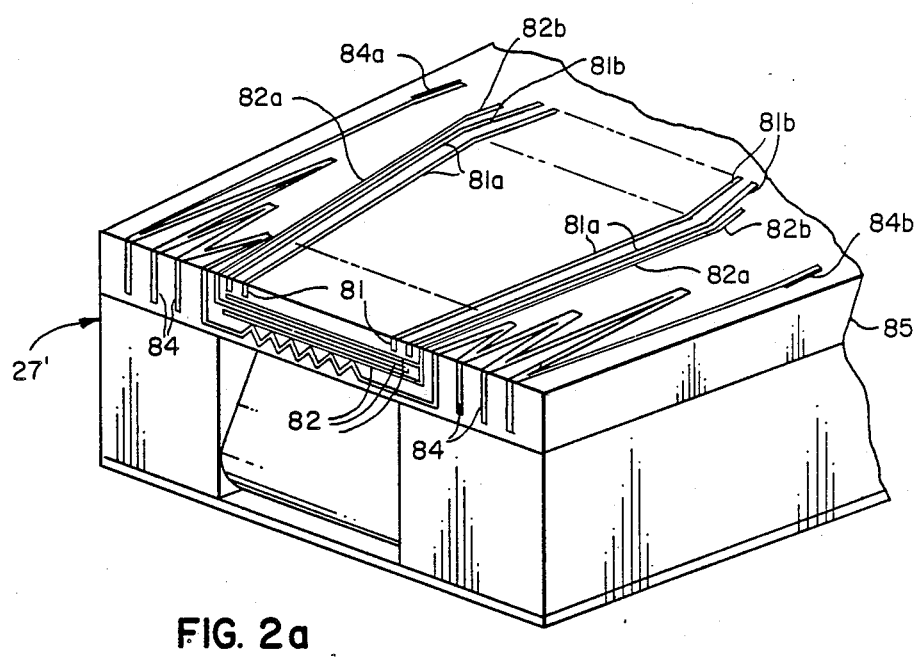

Referring now to FIGS. 2-A and 2-B, one preferred embodiment of charge plate construction 80 according to the present invention is illustrated in perspective. In general the unitary construction 80 comprises: (i) a plurality of spaced charge electrodes 81, each having lead portions 81a and connector pad portions 81b, (ii) a plurality of deflection field electrodes 82, having lead portions 82a and connector pad portions 82b, (iii) a plurality of resistive heater elements 84 extending in serpentine patterns along the sides of, and below, the electrode portions and (iv) a matrix material forming a dielectric block 85 in which the electrode and heater structures are embedded. The structure and function of the charge and deflection electrode structure are described in detail in concurrently filed U.S. application Ser. No. 07/264737, entitled "Improved Constructions and Fabrication Methods for Drop Charge/Deflection in Continuous Ink Jet Printer" in the names of Howell et al, which is incorporated herein by reference. In general, the electrodes 81 are selectively energized with voltage pulses in timed relation to the drop stream to induce charge on drops in accord with print information, and the deflection electrodes 82 are continuously energized to deflect charged drops.

A preferred fabrication for forming the electrode elements and heater elements as an integral unit will be described in detail subsequently with respect to FIGS. 3–7; however some preferred parameters as to the size and composition of the components or such unit will be instructive. Thus the heater elements can be formed of plated materials similar to the charge and deflection electrode elements, e.g. nickel. An exemplary preferred embodiment of the serpentine strip pattern comprises plated strips of about 0.002" width with 0.002" spacings between strips. As shown the resistor pattern 84 of the FIG. 2-A embodiment comprises a continuous element extending from power terminal 84a along the left upper face adjacent the electrode region, then to the front face of the unit, below the electrode region, and hence, in a serpentine pattern along the right upper face adjacent the electrode region to a ground terminal 84b. The energizing of heater 84 is preferably such as to provide a watt density level of about 15 watts/square inch.

Referring now to FIGS. 3–7, one preferred fabrication method for constructing a combined charge/deflection electrode assembly with integral surface heater means in accord with the present invention, is illustrated. In this method of fabricating the assembly, a pattern 104 defining the charge and deflection electrode and heater element outlines (and their associated connecting structure outlines) is formed in a covering 102 which is resistant to plating operations and supported on a substantially planar foil sheet 100. In FIG. 3-A, the outlines for the charge electrodes and related connection circuits are denoted 105, the outlines for the deflection electrodes and their related connection circuits are denoted 103, and the outlines for the heater elements are denoted 120. Preferably, the foil sheet 100 is copper and the pattern 104 is formed by initially laminating a photoresistive film, as covering 102, to the foil sheet, exposing the photoresistive covering to actinic light through a photomask to define the electrode and heater circuit patterns and removing the portion of the covering corresponding to the pattern to expose the surface of the copper foil thereunder. A portion of the patterned photoresist/foil component is shown in cross section in FIG. 3-B.

The foil sheet is then plated through the exposed pattern 104 with an electrically conducting material, preferably nickel, to form charge electrodes 81 and the associated connecting circuit structures 81a, 81b, the deflection electrodes 82 and their associated connecting circuit structures 82a, 82b and the heater element 84 and its power and ground terminal 84a, 84b (see FIG. 5-A). The electrodes and heater elements and associated circuit leads are preferably formed to a thickness which exceeds the thickness of the photoresistive covering as shown in FIG. 4. By plating to a thickness beyond that of the photoresistive covering, the plated material extends above and expands over the upper surface of the electrodes, heater elements and circuit leads. The plating operation is limited such that no two of the flanges interconnect with one another. The remainder of the photoresistive covering is then thoroughly removed from the foil sheet such that the electrodes, heater elements and the connecting circuit leads with their retaining flanges extend above the surface of the foil sheet as shown in FIG. 5-B.

The foil sheet is then bent toward the plated material so that a portion of the electrodes and heater elements are angularly oriented, at approximately a 90° angle, relative to the circuit leads as shown in FIG. 6. The bending step can if desired be performed before removal of photoresist layer 102.

A dielectric matrix is then formed to surround the plated material including the retaining flanges as shown in FIG. 7. The matrix is formed to have two of its exterior surfaces defined by the interior of the foil sheet. The foil sheet is then removed from the matrix and embedded plated material (e.g. by etching). This exposes surfaces of the plated material electrodes, heater elements and circuit leads with the remainder embedded within the substrate and preferably anchored thereto by means of retaining flanges. The combined assembly with foil sheet 100 removed is as shown in FIG. 2-A.

Preferably, the embedding procedure just referred to is effected by clamping the bent foil sheet into a mold with both the portion of the sheet including the connecting circuit leads and the bent portion of the sheet being clamped to the mold. This ensures flatness of those portions of the substrate after the potting step. The dielectric substrate is then formed by inserting molding material, such as an epoxy resin, into the mold and curing the molding material to form the dielectric matrix. Further details of this preferred procedure can be generally as described in U.S. Pat. No. 4,560,991.

After fabrication as described above the completed unit 80, charge/deflection plate with integral resistive heater elements, is mounted on catcher 27' as shown in FIG. 2-B. It is preferred that the heater operate to maintain the print head surfaces at the minimum temperature that will reliably insure that the contiguous vapor does not condense on them. This minimum temperature will depend upon the nominal operating ink temperature, the spacing between the ink jet streams and the charge plate and catcher surfaces and the ambient humidity and temperature. In general, it should be above the dew point of the region around the ink jet streams. In one preferred embodiment with an issuing ink temperature of about 85° F., heating surface portions of the charge plate unit to temperatures in the range of between 110° F. and 130° F. was found sufficient to prevent condensation on both the catcher and charge plate. Other ink - charge plate temperature differentials can be utilized and one skilled in the art can determine operable temperature differentials by visual observations while changing the applied heating power. The heater can operate at a predeterminedly fixed power level or under sensor control.

One alternative preferred embodiment of the present invention is shown in FIG. 8. In this embodiment the deflection electrode elements are formed as portions of a continuous circuit path leading between terminals 284A, 284b. Interspersed with the deflection electrode portions 282 the circuit path is disposed to form resistive heater portions 284 on each side of the charge electrodes 281 and their forward lead portions 281a, and below the deflection electrode portions 282 define by circuit path. Thus the single set of terminals 284a, 284b energize both the heating and deflection field portions of the circuit path.

The invention has been described in detail with particular reference to preferred embodiments thereof, but it will be understood that variations and modifications can be effected within the spirit and scope of the invention.

I claim:

1. In continuous ink jet printing apparatus of the kind having means for directing a plurality of ink streams through a drop charge region toward a print zone an improved lower print head construction comprising:
    (a) a support block having a lead support surface and an orthogonal electrode support surface located adjacent said drop charge region;
    (b) charging means, including charge electrode portions on said electrode support surface and lead portions on said lead support surface, for discretely imparting information charge to said drop streams; and
    (c) resistive heater means including resistive element portions located on said block surfaces in closely spaced relation to said charge electrodes and lead portions;
    said support block comprising a dielectric matrix integrally embedding said charging and heating means in said closely spaced relation.

2. The invention defined in claim 1 wherein said charging and heater means comprise electroplated elements and said dielectric matrix is molded around said elements.

3. In continuous ink jet printing apparatus of the kind having means for directing a plurality of ink streams through a drop charge region, a charge plate construction comprising:
    (a) a plurality of drop charge electrodes, each having a lead connector portion;
    (b) heater means including resistive heater element configured in a serpentine path closely spaced to said charge electrodes and their lead portions for receiving a heating voltage; and
    (c) a dielectric matrix integrally embedding said charge electrodes and heater elements in said closely spaced relation.

4. The invention defined in claim 3 wherein said charging and heating are electroplated elements and said dielectric matrix is molded around said elements.

5. In continuous ink jet printing apparatus of the kind having means for directing a plurality of ink streams through a drop charge region toward a print zone, an improved an improved lower print head construction comprising:
    (a) charging electrode means including drop charge electrode portions located adjacent said drop charge region;

(b) deflection electrode means located downstream from said charging means;

(c) resistive heater means including resistive heating element portions located around the operative surfaces of said charging and deflection electrode means; and (d) dielectric means for integrally embedding said charging electrode means, said deflection electrode means and said heater means in closely spaced relation.

6. The invention defined in claim 5 wherein said electrode means and said heater means are electroplated elements and said dielectric means is molded around said elements.

7. The invention defined in claim 5 wherein said deflecting electrode means and said resistive heater means comprises a continuous element having a serpentine path between energizing and ground terminals.

* * * * *